United States Patent [19]

Hashimoto

[11] Patent Number: 5,706,271
[45] Date of Patent: Jan. 6, 1998

[54] METHOD FOR RECORDING INFORMATION ON AN ERASABLE OPTICAL RECORDING MEDIUM

[75] Inventor: Hirokuni Hashimoto, Yokohama, Japan

[73] Assignee: Ricoh Company, Ltd., Tokyo, Japan

[21] Appl. No.: 648,571

[22] Filed: May 16, 1996

[30] Foreign Application Priority Data

Jun. 1, 1995 [JP] Japan .................. 7-134907

[51] Int. Cl.⁶ .................................................. G11B 7/00
[52] U.S. Cl. .................... 369/116; 369/54; 369/275.2; 369/275.3
[58] Field of Search .................. 369/116, 275.2, 369/275.3, 54, 58

[56] References Cited

U.S. PATENT DOCUMENTS 5,513,166  4/1996  Tokumitsu ............... 369/116

FOREIGN PATENT DOCUMENTS 5-12669  1/1993  Japan .
5-143997  6/1993  Japan .

Primary Examiner—David C. Nelms
Assistant Examiner—Kim-Kwok Chu
Attorney, Agent, or Firm—Dickstein Shapiro Morin & Oshinsky LLP

[57] ABSTRACT

There is provided an optical information recording method which can manage a number of recordings which can be performed on each of several partitions in a test area. The recording method uses an erasable recording medium on which information is recordable a plurality of times in the same area by a laser beam. The erasable recording medium includes a data area in which the information is recorded and a test area divided into a plurality of partitions each of which is provided for testing a recording power of the laser beam. In the method, the laser beam is projected onto one of the partitions so as to perform a test recording. The recording power of the laser beam is calibrated so as to adjust the recording power to an appropriate level before recording the information in the data area of the erasable recording medium. Then, the number of test recordings is recorded in a predetermined area of the erasable recording medium. Accordingly, the format of the erasable recording medium is compatible with a conventional optical recording medium such as a recordable compact disc (CD-R).

18 Claims, 10 Drawing Sheets

METHOD FOR RECORDING INFORMATION ON AN ERASABLE OPTICAL RECORDING MEDIUM

BACKGROUND OF THE INVENTION

1. Field of the Invention

The present invention generally relates to an optical information recording method and, more particularly, to an optical information recording method and apparatus for recording information on a recording medium such as an optical disc which can be rewritten a plurality of times.

2. Description of the Related Art

An optical disc such as a compact disc (CD) is known as one type of information recording media. According to a recording format of the CD, a recording area of the CD comprises a lead-in area, a program area and a lead-out area. These areas are arranged in that order in a direction from an inner periphery to an outer periphery of the CD. Index information referred to as Table of Contents (TOC) is recorded in the lead-in area. The TOC includes management information as a sub-code which is used for managing information recorded in the program area. For example, if main information recorded in the program area is information related to a music tune, the management information may be playing time of the tune. Information of a track number of corresponding music tune may also be recorded in the program area. A lead-out code which indicates an end of the information area is recorded in the lead-out area.

A compact disc having the above-mentioned format is an information medium used exclusively for reproduction. A CD of this type is referred to as a regular CD.

In recent years, optical discs such as a recordable compact disc (CD-R) and an erasable compact disc (CD-E) have been developed. The recordable compact disc referred to as CD-R is a recording medium operated by a write once recording method. That is, the CD-R is recordable only once, and thus recording on the CD-R is merely adding information in an area which has not been recorded. More specifically, the CD-R cannot be overwritten, or information recorded on the CD-R cannot be erased. The CD-R uses a format similar to the regular CD so that the CD-R is compatible with the regular CD. The format of the CD-R is referred to as the Orange Book Part II which is based on the format of the regular CD.

Unlike the CD-R, the erasable compact disc referred to as CD-E is a recording medium which is recordable a plurality of times in the same recording area. The format of the CD-E, which is still in the process of establishment, tends to be compatible with the format of the CD-R.

Figure 1:
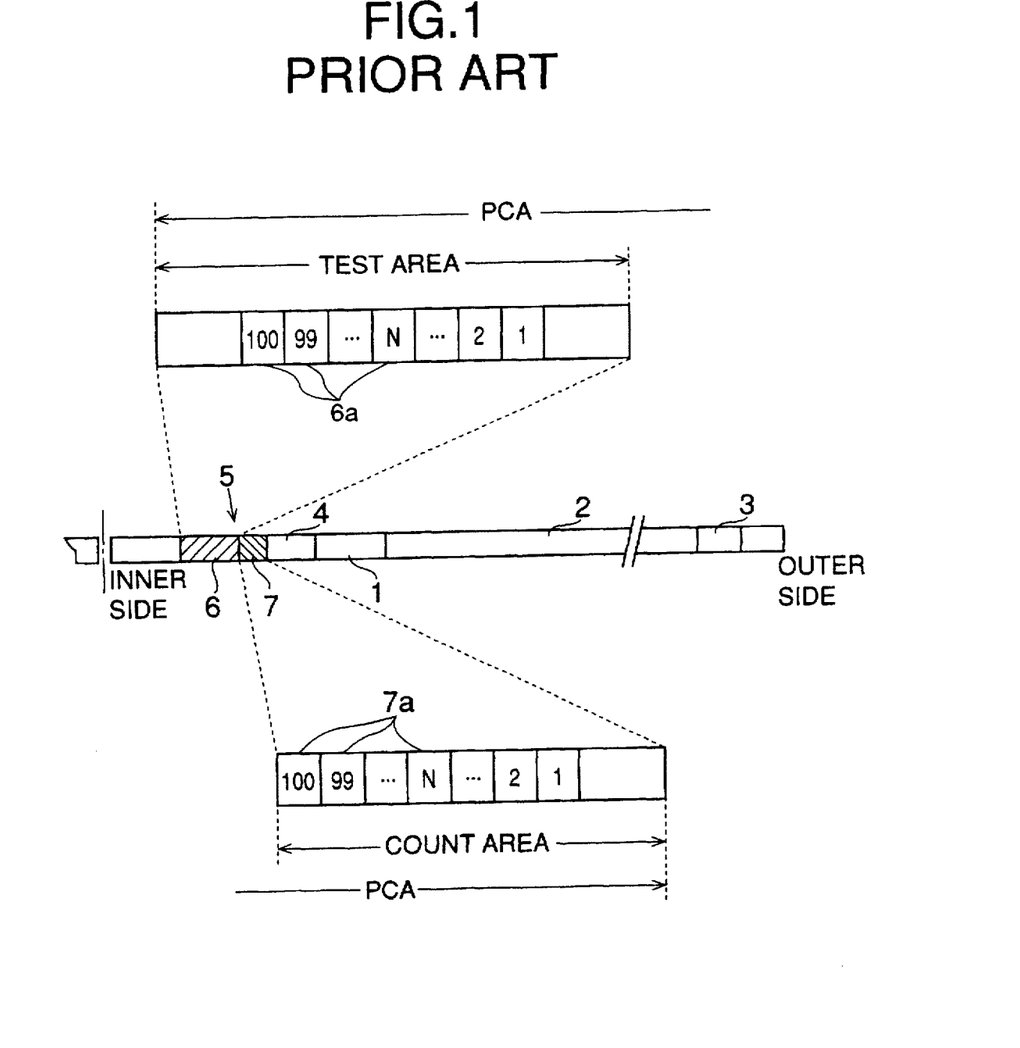
FIG. 1 is an illustration for explaining a structure of a format of a recordable compact disc.

FIG. 1 is an illustration for explaining a structure of the format of the CD-R. As shown in FIG. 1, the CD-R comprises a lead-in area 1, a data area 2 and a lead-out area 3. Additionally, the CD-R comprises a program memory area (PMA) 4 and a power calibration area (PCA) 5 on an inner side of the lead-in area 1. The PMA 4 stores history information with respect to information recorded in the data area. The history information includes information such as a start address and end address of each track number. The history information is recorded in the PMA 4 in accordance with a format similar to the format for the TOC information in the lead-in area 1.

The PCA 5 is an area in which a test recording is performed prior to a real recording in order to correct power of a laser beam used for performing the real recording in the data area 2. The PCA 5 comprises a test area 6 and a count area 7. The test area 6 is an area in which a test recording is performed. The test is referred to as optimum power calibration (OPC). The test area 6 is normally divided into one hundred partitions 6a. The count area 7 indicates a state of each of the partitions 6a as to whether each of the partitions 6a is used or unused. Thus, one hundred partitions 7a are correspondingly formed in the count area 7.

Japanese Laid-Open Patent Applications No. 5-12669 and No. 5-143997 disclose methods for testing recording power in a test area, the methods being related to the CD-R mentioned above.

Japanese Laid-Open Patent Application No. 5-12669 discloses the method in which the time spent on a recording operation is reduced by performing a test recording immediately before a real recording in a data area when a recording command is supplied. Japanese Laid-Open Patent Application No. 5-143997 discloses the method in which, when an error occurs during a test recording, a test signal is recorded in an empty area which is not used for a normal recording. This is to eliminate a reduction in a number of recordings and recording with an erroneous recording power.

As mentioned above, the CD-R is the write once recording media. Thus, the partitions 6a in the test area 6 as well as the data area 2 of the CD-R cannot be used twice. On the other hand, since the CD-E can record a plurality of times in the same area, each of the partitions 6a in the test area 6, if the same format is used for the CD-E, can be used a plurality of times. For example, if an allowable number of recordings is n, the calibration OPC can be performed for 100 times n at the maximum.

However, there is a limit for the number of recordings on CD-E due to the property of the medium. In the conventional test method used for the CD-R, the number of recordings performed in each of the partitions 6a is not monitored. Thus, if the number of recordings for the same partition 6a exceeds the maximum allowable number, the medium may be deteriorated. This causes a problem in that an appropriate recording power cannot be obtained by the OPC.

The above-mentioned two documents disclose testing methods for obtaining an appropriate recording power by using a test area. However, since those methods are related not to the CD-E but the CD-R which is of the write once type, these methods do not involve the above-mentioned problem, and thus no solution is provided by those methods.

SUMMARY OF THE INVENTION

It is a general object of the present invention to provide an improved and useful optical information recording method in which the above-mentioned problems are eliminated.

A more specific object of the present invention is to provide an optical information recording method which can manage a number of recordings which can be performed on each of partitions in a test area.

Another object of the present invention is to provide an optical information recording method in which a format of a recording medium is compatible with a conventional optical recording medium such as a recordable compact disc (CD-R).

In order to achieve the above-mentioned objects, there is provided an optical information recording method using an erasable recording medium on which information is recordable a plurality of times in the same area by means of a laser beam, the erasable recording medium comprising a data area in which the information is recorded and a test area divided into a plurality of first partitions each of which is provided for testing a recording power of the laser beam, the optical information recording method comprising the steps of:

a) projecting the laser beam onto one of the first partitions so as to perform a test recording;

b) calibrating the recording power of the laser beam so as to adjust the recording power to an appropriate level before recording the information in the data area of the erasable recording medium; and c) recording a number of test recordings in a predetermined area of the erasable recording medium.

According to the above-mentioned invention, since the number of test recordings which have been performed on the same first partitions in the test area is recorded in the predetermined area on the erasable recording medium, use of one of the first partitions can be managed by referring to the number of test recordings recorded in the predetermined area.

In one embodiment of the present invention, the erasable recording medium further comprises a count area divided into a plurality of second partitions each of which corresponds to a respective one of the first partitions, and further comprising the step of:

d) recording the number of test recordings in one of the second partitions which corresponds to the one of the first partitions.

The above-mentioned optical information recording method may further comprise the step of:

e) searching another one of the first partitions when the number of recordings of the one of the first partitions is not readable, the another one of the first partitions has not been previously used; and f) performing the test recording on the another one of the first partitions.

Additionally, the method may further comprise the steps of:

g) determining whether or not the number of the test recordings of the another one of the first partitions reached a maximum allowable recordings; and h) performing the test recording on one of the first partitions other than the another one of the first partitions.

The maximum allowable recordings may be determined based on characteristics of the erasable recording medium. The method may further comprise the step of:

i) performing the test recording on one of the first partitions other than the another one of the first partitions when the recording power obtained by the test recording in step h) is outside of an allowable range.

In one embodiment of the present invention, the optical information recording method of the present invention may further comprise the step of:

j) recording the number of the test recordings in the one of the first partitions by performing the test recording by recording information representing the number of the test recordings.

Additionally, the method may further comprises the step of:

k) searching another one of the first partitions when the number of recordings of the one of the first partitions is not readable, the another one of the first partitions not been previously used; and l) performing the test recording on the another one of the first partitions.

The method may further comprise the steps of:

m) determining whether or not the number of the test recordings of the another one of the first partitions has reached a maximum number of allowable recordings; and n) performing the test recording on one of the first partitions other than the another one of the first partitions.

The maximum number of allowable recordings is determined based on characteristics of the erasable recording medium. Additionally, the method may further comprise the step of:

o) performing the test recording on one of the first partitions other than the another one of the first partitions when the recording power obtained by the test recording in step n) is outside of an allowable range.

Further, in the optical information recording method according to the present invention, the erasable recording medium may be a disc-like optical recording medium such as a compact disc.

Other objects, features and advantages of the present invention will become more apparent from the following detailed description when read in conjunction with the accompanying drawings.

DETAILED DESCRIPTION OF THE PREFERRED EMBODIMENTS

Figure 2:
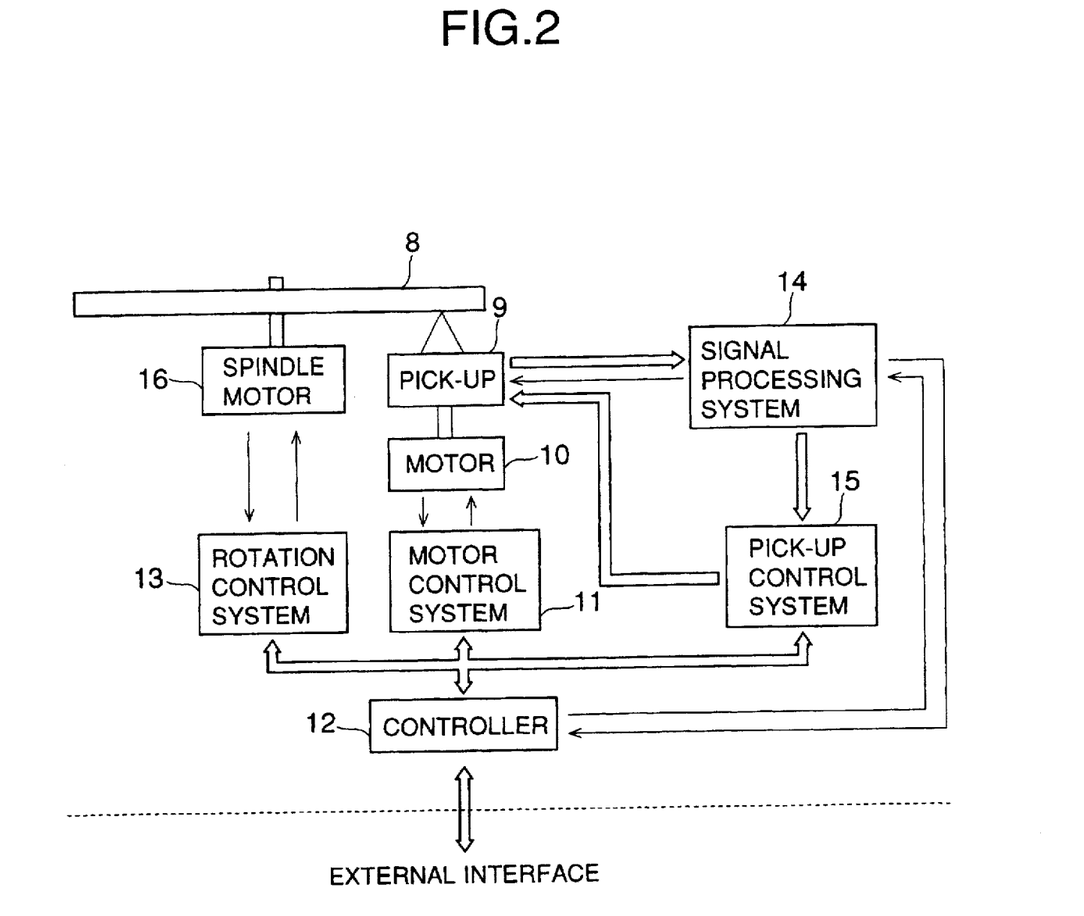
FIG. 2 is a block diagram of an optical information recording apparatus used for the present invention.

A description will now be given of a first embodiment of the present invention. FIG. 2 is a block diagram of an optical information recording apparatus used for performing a method according to the present invention.

The optical information recording apparatus shown in FIG. 2 is an optical disc drive unit using an optical disc 8 such as the CD-E. In the optical disc drive unit, an optical pick-up 9 is provided to record information on or reproduce information from the optical disc 8. The optical pick-up 9 is connected to a motor 11 so as to be moved between an inner side and an outer side of the optical disc 8 to perform a seek operation. The motor 10 is connected to a controller 12 via a motor control system 11. The controller 12 is connected to a rotation control system 13, a signal processing system 14 and a pick-up control system 15. The rotation control system 13 is connected to a spindle motor 16 so as to rotate the optical disc 8. The signal processing system 14 and the pick-up control system 15 are connected to the optical pick-up 9 so as to perform a recording or reproducing operation and a servo control operation (focussing, tracking) of the optical pick-up 9.

Figure 3:
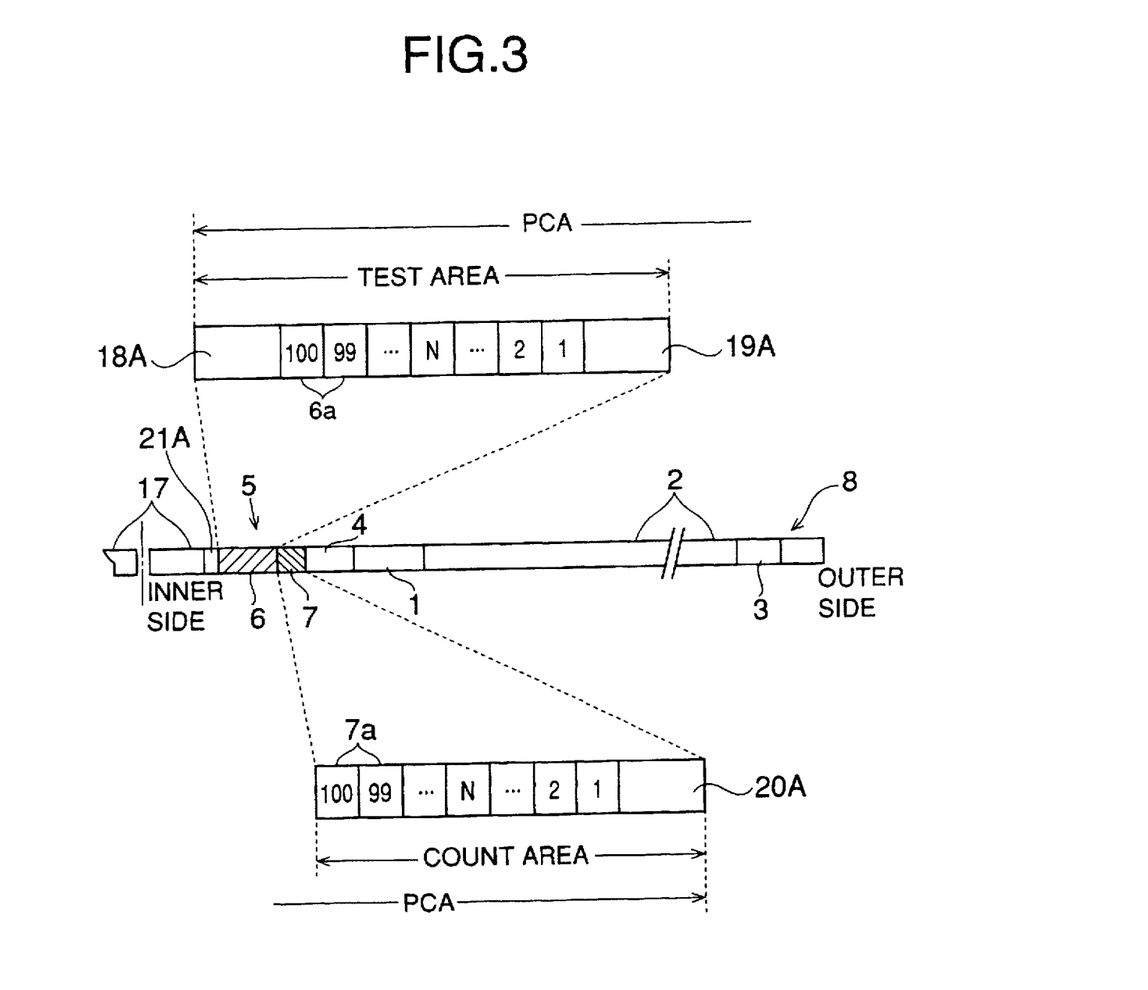
FIG. 3 is an illustration for explaining a format of an optical disc shown in FIG.2.

FIG. 3 is an illustration for explaining a format of the optical disc 8. In FIG. 3, parts that are the same as the parts shown in FIG. 1 are given the same reference numerals. The optical disc 8 is an information medium such as the CD-E which is overwritable.

The optical disc 8 is provided with an area corresponding to the PCA 5. The PCA 5 comprises the test area 6 and the count area 7. The test area 6 is divided into a plurality of partitions 6a on which a test (OPC) for determining an appropriate laser power (recording power) is performed. The count area 7 is also divided correspondingly into a plurality of partitions 7a. Each of the partitions 6a of the test area comprises 15 sectors, while each of the partitions 7a of the count area 7 comprises 1 sector. Additionally, the PMA 4, the lead-in area 1, the data area 2 and a lead-out area 3 are provided on the optical disc 8 so that the format of the optical disc 8 is based on the format of the CD-R.

In the optical disc 8, a blank area, which is not assigned for recording regular information, is assigned for a management area A for recording the number of recordings already performed on each of the partitions 6a. For example, blank areas 18A and 19A in the test are 6, a blank area 20A in the count area, or a blank area 21A formed between a clamp area 17 and the PCA 5 may be used as the management area A. A blank area (not shown in the figure) in the lead-in area 1, the data area 2 or the lead-out area 3 may also be used as the management area A. It should be noted that partitions 6a in the test area 6 or the partitions 7a in the count area 7 may also be used as the management area A. This will be discussed in a second embodiment of the present invention described later.

Figure 4:
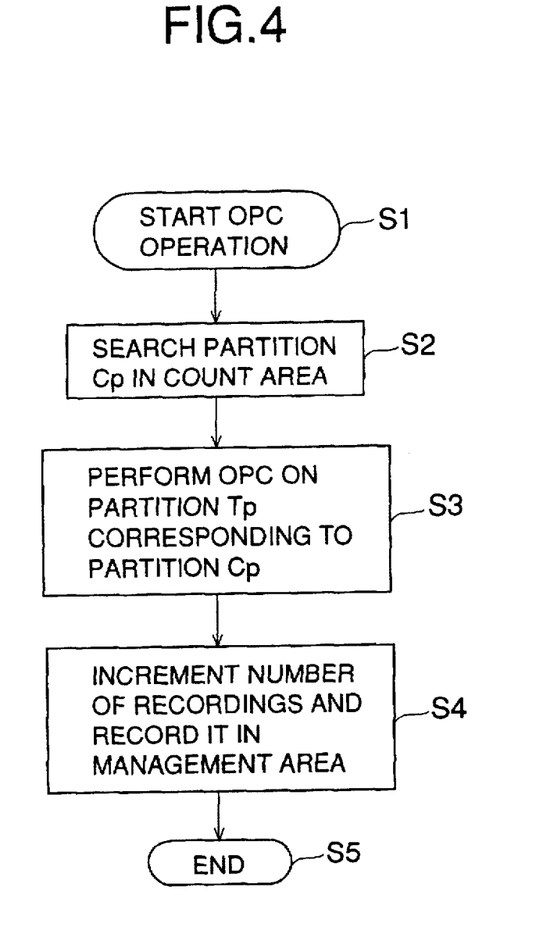
FIG. 4 is a flowchart of a basic OPC operation according to a first embodiment of the present invention.

A description will now be given of an operation performed in the first embodiment. FIG. 4 is a flowchart of a basic OPC operation according to a first embodiment of the present invention. The basic OPC operation is performed as an initial operation when no recording is performed in the partitions 6a and thus the time of the recording is not recorded on the management area A. When the basic OPC operation shown in FIG. 4 is started in step S1, a partition 7a (Cp), which indicates that the OPC can be performed on a corresponding partition 6a (Tp), is searched in step S2. Then, the OPC operation is performed, in step S3, by projecting a laser beam onto the partition 6a (Tp) which corresponds to the partition 7a (Cp) searched in the previous step S2. The number of recordings of the partitions 6a (Tp) is then incremented in step S4, and recorded in the management area A, for example, the blank area 18A in the test area 6, and the routine is ended in step S5.

Figure 5:
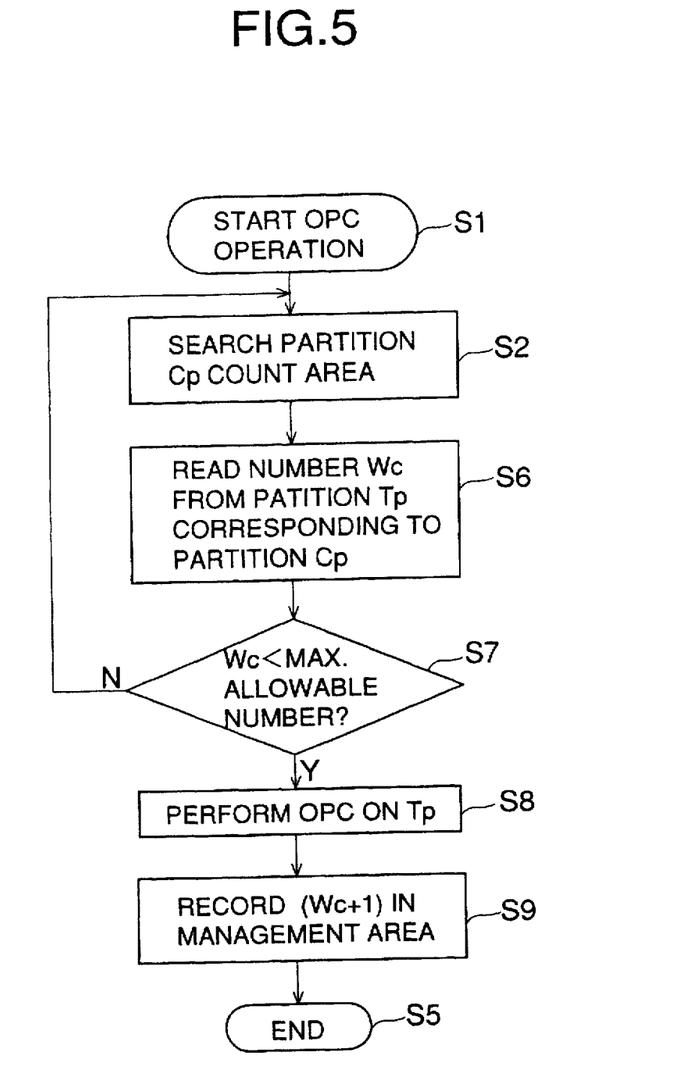
FIG. 5 is a flowchart of an OPC operation according to the first embodiment of the present invention which is performed on the basis of the number of recordings recorded in a management area A.

FIG. 5 is a flowchart of an OPC operation which is performed on the basis of the number of recordings recorded in the management area A. In FIG. 5, steps that are the same as the steps in FIG. 4 are given the same step number.

When the OPC operation shown in FIG. 5 is started in step S1, a partition 7a (Cp), which indicates that the OPC can be performed on a corresponding partition 6a (Tp), is searched in step S2. Then, in step S6, the number Wc of recordings which have been performed on the partition 6a (Tp) is read from the management area A. It is then determined, in step S7, whether or not the number of recordings is greater than the maximum allowable number. If it is determined that the number Wc has reached the maximum allowable number, the routine returns to step S2 so as to search another partition 6a which is usable since the partition 6a searched in the previous step S2 is determined to be unusable. If it is determined that the number Wc has not reached the maximum allowable number, the routine proceeds to step S8. In step S8 the OPC operation is performed by projecting a laser beam onto the partition 6a (Tp) which corresponds to the partition 7a (Cp) searched in the previous step S2. The number Wc of recordings of the partitions 6a (Tp) is then incremented in step S9, and recorded in the management area A, and the routine is ended in step S5.

After the recording power is adjusted by the OPC operation, the optical pick-up 9 is moved from the inner side to the outer side along the recording surface of the optical disc 8 so as to record information in the data area 2. Thus, the information recorded in the data area is positively readable since the information is recorded with appropriate recording power.

As discussed above, the number of recordings which can be performed on each of the partitions 6a in the test area 6 can be managed by recording the number of recordings which has been performed for each of the partitions 6a in the management area A provided on the optical disc 8. If a blank area existing in the format of a conventional recording media such as the CD-R is used as the management area A, a format of the optical disc 8 such as the CD-E can be compatible with the CD-R.

Additionally, if the number of recordings recorded in the management area A has reached the maximum allowable number, the OPC operation will not be performed on the partition 6a corresponding to the number of recordings which has reached the maximum allowable number since another partition which is still usable is searched and used for the OPC operation. Thus, the OPC operation is always performed on one of the partitions 6a which is still in a good recordable condition.

A description will now be given of an operation according to a second embodiment of the present invention. The second embodiment is performed by the optical information recording apparatus shown in FIG. 2 and by using the optical disc shown in FIG. 3.

Figure 6:
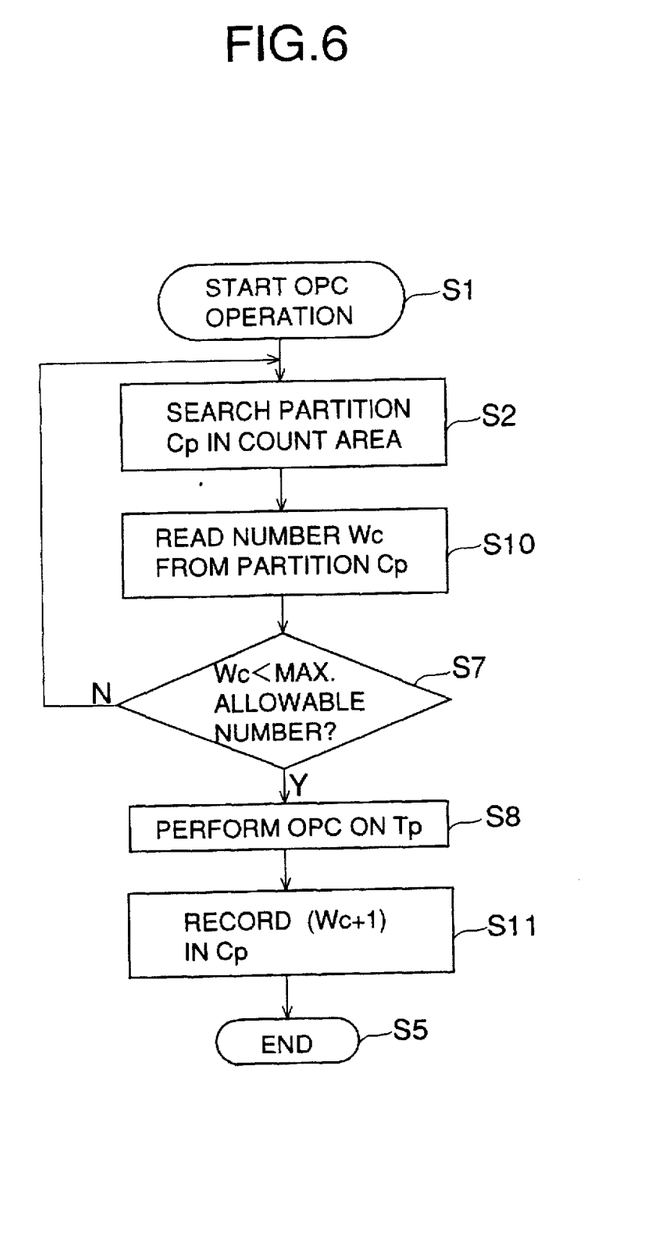
FIG. 6 is a flowchart of an OPC operation according to a second embodiment of the present invention.

FIG. 6 is a flowchart of an OPC operation according to a second embodiment of the present invention. In FIG. 6, steps that are the same as the steps shown in FIG. 5 area given the same step numbers. The OPC operation shown in FIG. 6 is an operation when the number Wc of recordings is recorded in one of the partitions (7a).

When the OPC operation shown in FIG. 6 is started in step S1, a partition 7a (Cp), which indicates that the OPC can be performed on a corresponding partition 6a (Tp), is searched in step S2. Then, in step S6, the number Wc of recordings which has already been performed on the partition 6a (Tp) is read from the partition 7a (Cp). It is then determined, in step S7, whether or not the number of recordings is greater than the maximum allowable number. If it is determined that the number Wc has reached the maximum allowable number, the routine returns to step S2 so as to search another partition 6a which is usable since the partition 6a searched in the previous step S2 is determined to be unusable. If it is determined that the number Wc has not reached the maximum allowable number, the routine proceeds to step S8. In step S8 the OPC operation is performed by projecting a laser beam onto the partition 6a (Tp) which corresponds to the partition 7a (Cp) searched in the previous step S2. The number Wc of recordings of the partitions 6a (Tp) is then incremented in step S11, and recorded in the partition 7a (Cp) in the count area 7, and the routine is ended in step S5.

As discussed above, since the number Wc of recordings is recorded in one of the partitions 7a (Cp) in the count area 7, a format of an optical disc 8 such as the CD-E can be compatible with the CD-R.

Figure 7:
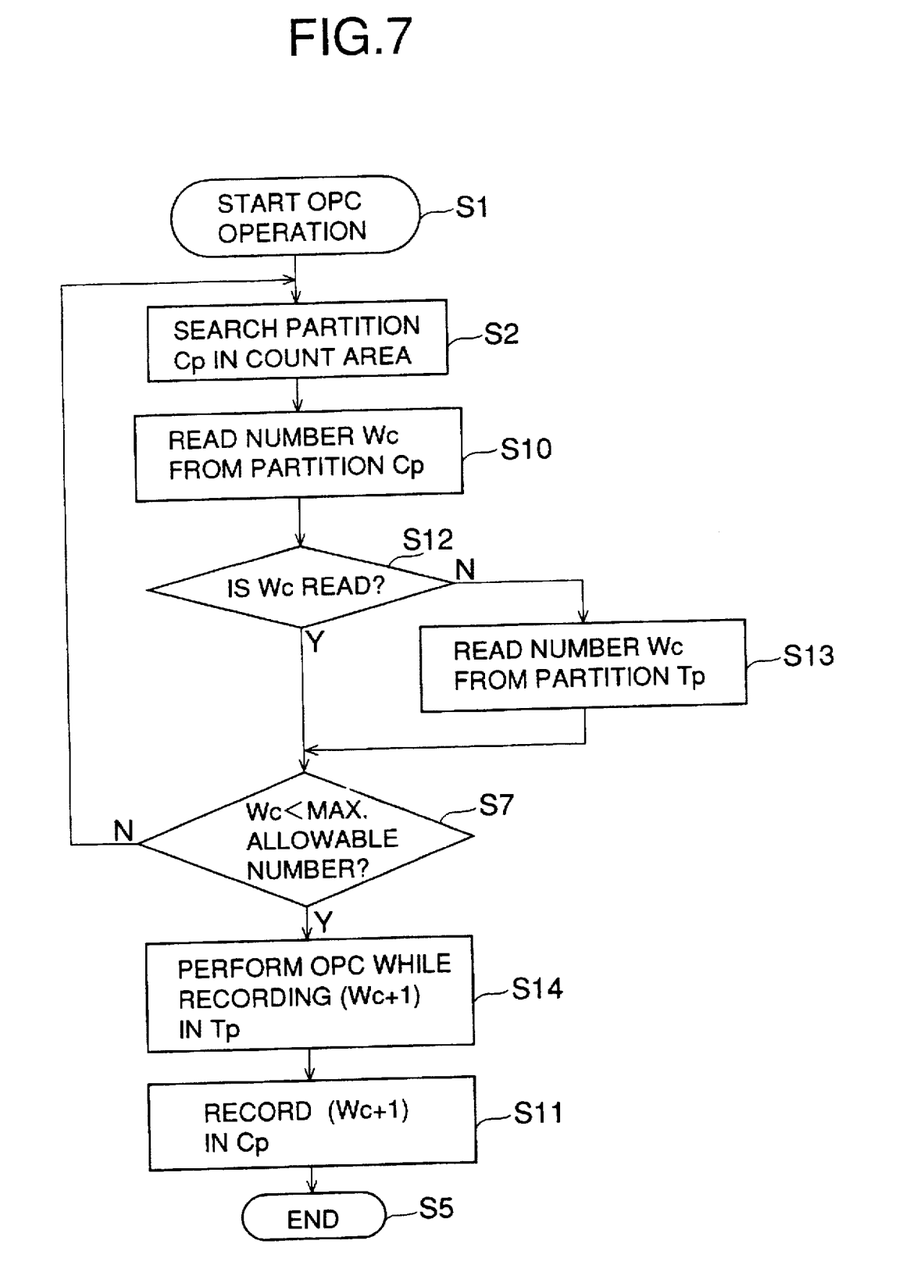
FIG. 7 is a flowchart of another OPC operation according to the second embodiment of the present invention.

FIG. 7 is a flowchart of another OPC operation according to the second embodiment of the present invention. In FIG. 7, steps that are the same as the steps shown in FIG. 6 are given the same step numbers. The OPC operation shown in FIG. 7 is an operation when the number Wc of recordings is recorded in one of the partitions 6a.

When the OPC operation shown in FIG. 7 is started in step S1, a partition 7a (Cp), which indicates that the OPC can be performed on a corresponding partition 6a (Tp), is searched in step S2. Then, in step S10, the number Wc of recordings which has already been performed on the partition 6a (Tp) is read from the partition 7a (Cp). It is then determined, in step S12, whether or not the number Wc of recordings was read in good or usable condition. If it is determined that the number Wc was not read in good condition, the routine proceeds to step S13. In step S13, the number Wc of recordings is read from the partition 6a (Tp), and the routine proceeds to step 7. If the number Wc is read in step S10, the routine directly proceeds to step S7. It is then determined, in step S7, whether or not the number of recordings is greater than the maximum allowable number. If it is determined that the number Wc has reached the maximum allowable number, the routine returns to step S2 so as to search another partition 6a which is usable since the partition 6a searched in the previous step S2 is determined to be unusable. If it is determined that the number Wc has not reached the maximum allowable number, the routine proceeds to step S14. In step S14, the OPC operation is performed by projecting a laser beam onto the partition 6a (Tp) while recording the incremented number Wc+1 in the same partition 6a (Tp). Then, in step S11, the number Wc+1 is recorded in the partition 7a (Cp) corresponding to the partition 6a (Tp), and the routine is ended in step S5.

As discussed above, each of the partitions 6a in the test area 6 comprises 15 sectors. Thus, information such as the number of recordings recorded in one the partitions 6a is positively read as compared to information recorded in one of the partitions 7a which comprises a single sector. Since the number Wc of recordings is recorded in one of the partitions 6a in the count area 6 as well as in the corresponding partition 7a in the count area 7, a format of the optical disc 8 such as the CD-E can be compatible with the CD-R while reading the number of recordings is ensured.

Figure 8:
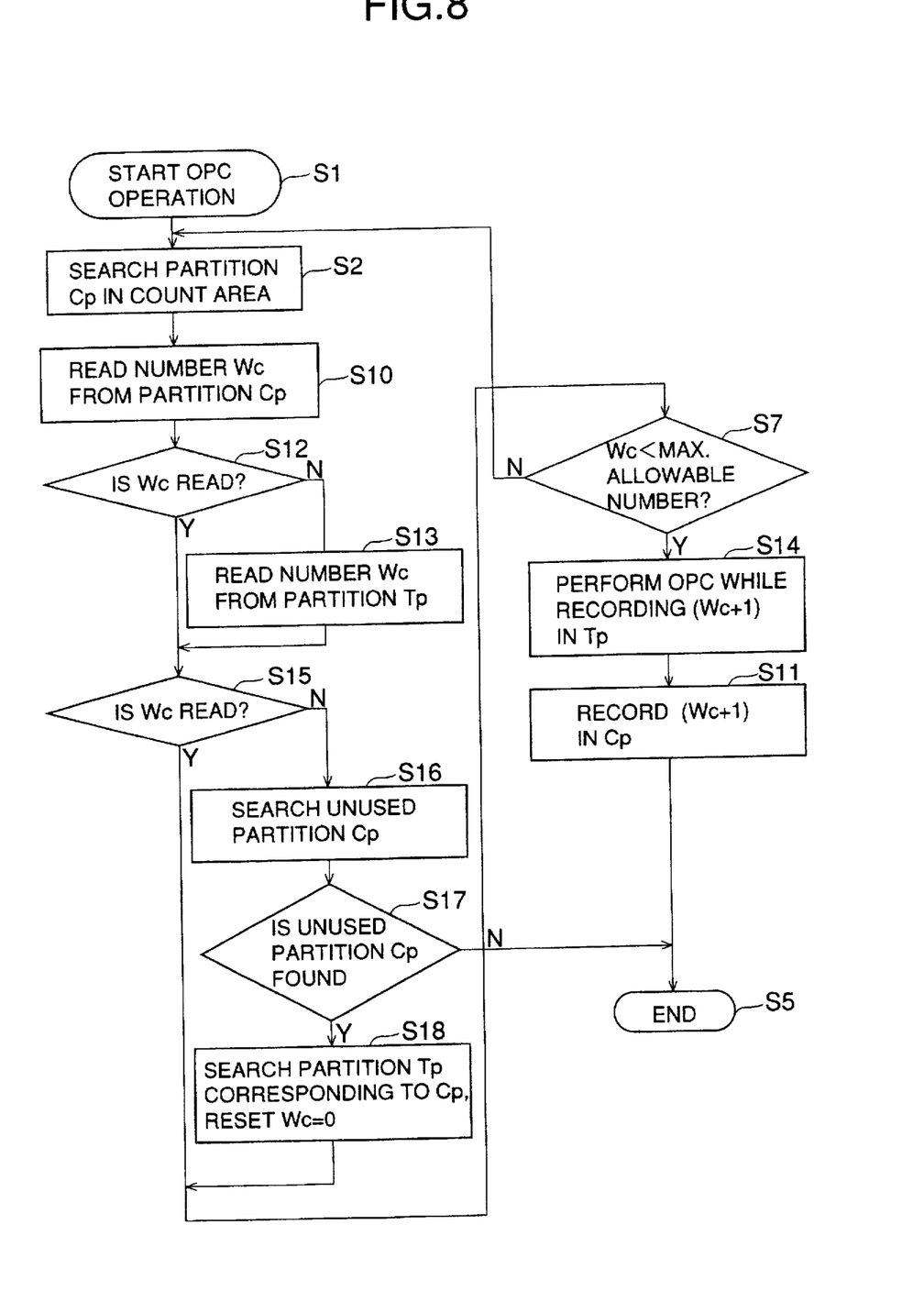
FIG. 8 is a flowchart of another OPC operation according to the second embodiment of the present invention.

FIG. 8 is a flowchart of another OPC operation according to the second embodiment of the present invention. In FIG. 8, steps that are the same as the steps shown in FIG. 7 are given the same step numbers, and descriptions thereof will be omitted. The OPC operation shown in FIG. 8 is an operation conducted when the number Wc of recordings cannot be determined when the OPC operations shown in FIGS. 6 and 7 are performed.

In the operation shown in FIG. 8, if it is determined, in step S12, that the number Wc is read in a good or usable condition, the routine proceeds to step S15 after performing the step S13. If it is determined, in step S12, that the number Wc is read in good condition, the routine directly proceeds to step S15. It is then determined again, in step S15, whether or not the number Wc of recordings is read. If it is determined that the number Wc is not read, the routine proceeds to step S16. In step S16, a partition 7a (Cp) is searched from among the partitions 7a by referring to the existence of the recording. It is then determined, in step S17, whether a partition 7a which has not been used was found. If there is found a partition 7a which has not been used, the routine proceeds to step S18. In step S18, the partition 7a corresponding to the partition 6a found in the previous step S17 is searched. At the same time the number Wc of recordings is reset to zero, and the routine proceeds to step S7. If it is determined, in step S17, that there is not a partition 7a which has not been used, the routine proceeds to step S5 to end the OPC operation.

As discussed above, if the number Wc of recordings cannot be read, the partition 6a which has not been used is searched to perform the OPC operation. Thus reliability of the OPC operation is increased.

A description will now be given of a third embodiment of the present invention. The third embodiment is performed by the optical information recording apparatus shown in FIG. 2 and by using the optical disc shown in FIG. 3.

Figure 9:
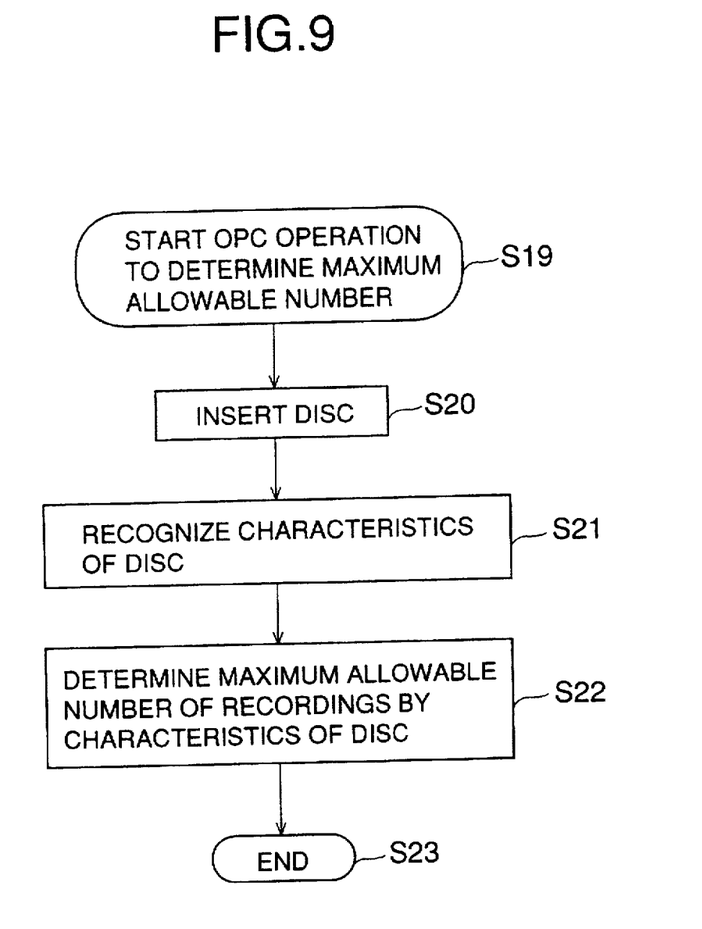
FIG. 9 is a flowchart of an operation performed to determine the maximum allowable number of recordings.

The maximum allowable number of recordings performed on a recording medium such as a CD-E differs due to characteristics determined by material of the CD-E, recordable length, etc. Thus, an operation shown in FIG. 9 is performed to determine the maximum allowable number of recordings for each disc. FIG. 9 is a flowchart for determining the maximum allowable number.

When the operation shown in FIG. 9 is started in step S19, the recording medium such as the optical disc 8 is inserted, in step S20, into the optical information recording apparatus. Then, in step S21, the characteristics of the optical disc 8 are checked. In step S22, the maximum allowable number of recordings of the optical disc 8 is determined according to the result of step S21, and the routine is ended in S23. The maximum allowable number thusly obtained may be used in step S7 of the OPC operations shown in FIGS. 5, 6, 7 and 8.

The characteristics of the recording medium may vary due to storage conditions or operating conditions. That is, even if the number of recordings of one of the partitions 6a in the test area 6 is less than the maximum allowable number, there is a possibility that an appropriate recording power cannot be obtained due to deterioration of the disc or the influences of damage, a flaw or dust on a surface of the disc. In order to eliminate such problems, an OPC operation shown in FIG. 10 may be performed.

Figure 10:
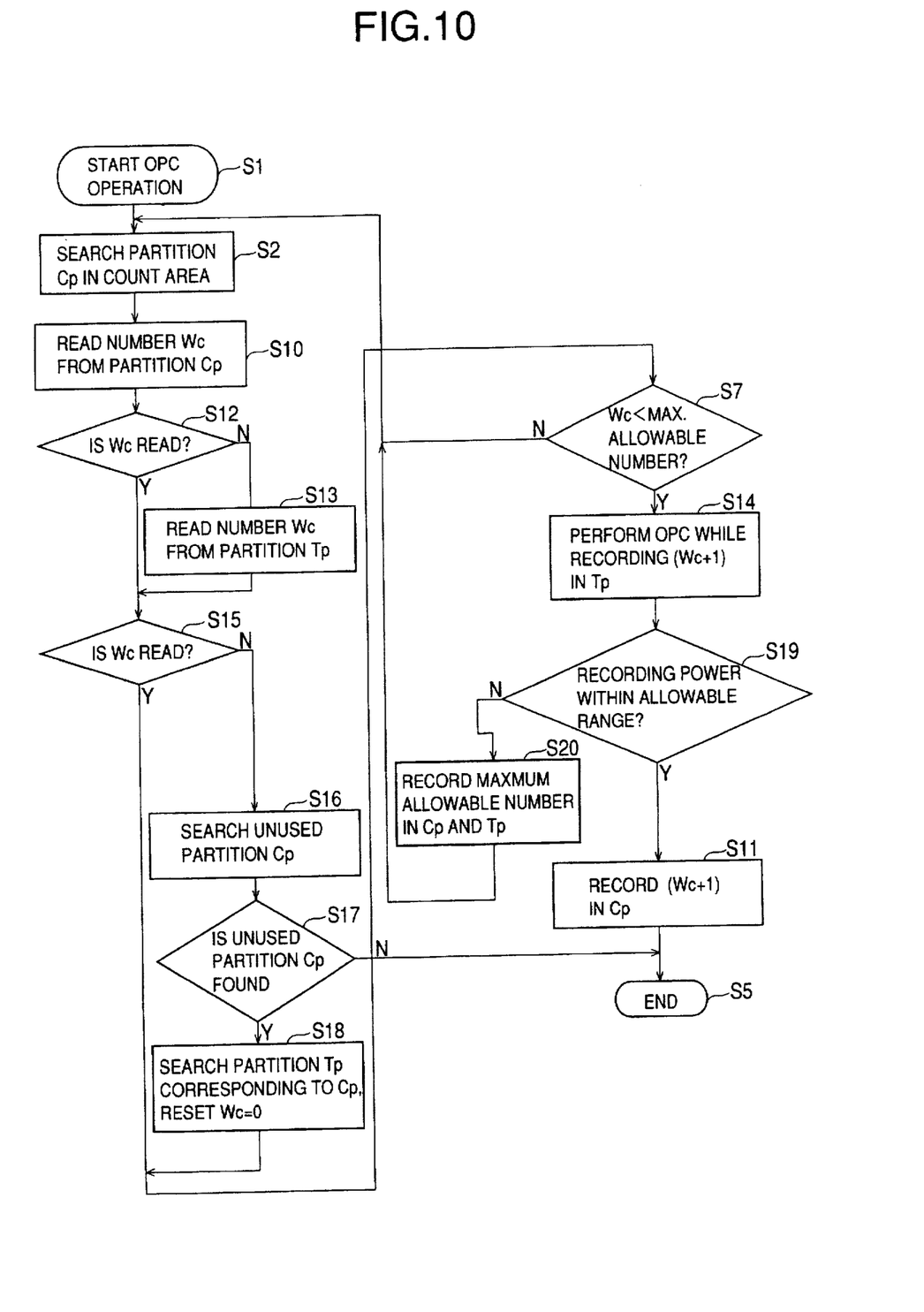
FIG. 10 is a flowchart of an OPC operation according to a third embodiment of the present invention.

FIG. 10 is a flowchart of an OPC operation according to the third embodiment of the present invention. In FIG. 10, steps that are the same as the steps shown in FIG. 8 are given the same step numbers, and descriptions thereof will be omitted. When the routine proceeds to step S14, the incremented number Wc+1 is recorded in the partition 6a (Tp) while performing the OPC operation. Then, the routine proceeds to step S19. It is determined, in step S19, whether or not the recording power determined by the OPC operation performed in step S14 falls within a predetermined allowable range. If the recording power is out of the predetermined allowable range, the routine proceeds to step S20. In step S20, the number Wc of recordings corresponding to the selected partition 6a is forcibly changed to the maximum allowable number, and the maximum allowable number is recorded in the partition 6a and the partition 7a so that the partition 6a is rendered unusable. The routine is then returned to step S2. If it is determined, in step S19, that the recording power falls within the predetermined allowable range, the routine proceeds to step S11 so as to record the incremented number Wc+1 in the partition 7a in the counter area 7, and the routine is ended.

Accordingly, in this embodiment, if an appropriate recording power is not obtained due to deterioration of characteristics in one of the partitions 6a in the test area 6 of the optical disc 8 for some reason, the OPC operation will be performed for another of the partitions 6a. Additionally, the number of recordings of the particular partition 6a is set to the maximum allowable number and the particular partition is rendered unusable.

It should be appreciated that the feature of one of the above-mentioned embodiments may be combined with another one of the embodiments for further improvement.

The present invention is not limited to the specifically disclosed embodiments, and variations and modifications may be made without departing from the scope of the present invention.

What is claimed is:

1. An optical information recording method for use with an erasable recording medium on which information is recordable a plurality of times in the same area by means of a laser beam, said erasable recording medium comprising a data area in which the information is recorded and a test area divided into a plurality of first partitions, each of which is provided for testing recording power of said laser beam, said optical information recording method comprising the steps of:

a) projecting said laser beam onto one of said first partitions so as to perform a test recording;

b) calibrating the recording power of said laser beam based on said test recording so as to adjust the recording power to an appropriate level before recording the information in said data area of said erasable recording medium; and c) recording in a predetermined area of said erasable recording medium the total number of test recordings which have been performed on said one of said first partitions.

2. The optical information recording method as claimed in claim 1, wherein said erasable recording medium further comprises a count area divided into a plurality of second partitions each of which corresponds to a respective one of said first partitions, and further comprising the step of:

d) recording in one of said second partitions which corresponds to said one of said first partitions the total number of the test recordings which have been performed in said one of said first partitions.

3. The optical information recording method as claimed in claim 2, further comprising the steps of:

e) searching another one of said first partitions when the total number of recordings which have been performed in said one of said first partitions is unreadable, said another one of said first partitions being previously unused; and f) performing the test recording on said another one of said first partitions.

4. The optical information recording method as claimed in claim 2, further comprising the step of:

r) performing the test recording on one of said first partitions other than said one of said first partitions when the recording power obtained by the test recording in step b) is outside of an allowable range.

5. The optical information recording method as claimed in claim 3, further comprising the steps of:

g) determining whether the total number of the test recordings which have been performed in said another one of said first partitions has reached a maximum allowable number of recordings; and h) performing the test recording on one of said first partitions other than said another one of said first partitions.

6. The optical information recording method as claimed in claim 5, wherein said maximum allowable number of recordings is determined based on characteristics of said erasable recording medium.

7. The optical information recording method as claimed in claim 6, further comprising the step of:

i) performing the test recording on one of said first partitions other than said another one of said first partitions when the recording power obtained by the test recording in step h) is outside of an allowable range.

8. The optical information recording method as claimed in claim 1, further comprising the step of:

j) recording the total number of the test recordings which have been performed in said one of said first partitions by performing the test recording by recording information representing the total number of the test recordings which have been performed.

9. The optical information recording method as claimed in claim 8, further comprising the step of:

k) searching another one of said first partitions when the total number of recordings which have been performed in said one of said first partitions is unreadable, said another one of said first partitions being previously unused; and l) performing the test recording on said another one of said first partitions.

10. The optical information recording method as claimed in claim 8, further comprising the step of:

s) performing the test recording on one of said first partitions other than said one of said first partitions when the recording power obtained by the test recording in step b) is outside of an allowable range.

11. The optical information recording method as claimed in claim 8, further comprising the steps of:

m) determining whether or not the total number of test recordings which have been performed in said another one of said first partitions has reached a maximum number of allowable recordings; and n) performing the test recording on one of said first partitions other than said another one of said first partitions.

12. The optical information recording method as claimed in claim 11, wherein said maximum number of allowable recordings is determined based on characteristics of said erasable recording medium.

13. The optical information recording method as claimed in claim 12, further comprising the step of:

o) performing the test recording on one of said first partitions other than said another one of said first partitions when the recording power obtained by the test recording in step n) is outside of an allowable range.

14. The optical information recording method as claimed in claim 1, wherein said erasable recording medium is a disc-like optical recording medium.

15. The optical information recording method as claimed in claim 1, further comprising the step of:

q) performing the test recording on one of said first partitions other than said one of said first partitions when the recording power obtained by the test recording in step b) is outside of an allowable range.

16. The optical information recording method as claimed in claim 1, further comprising the steps of:

p) determining whether the total number of the test recordings which have been performed in said one of said first partitions has reached a maximum number of allowable recordings; and q) performing the test recording on one of said first partitions other than said one of said first partitions.

17. The optical information recording method as claimed in claim 16, wherein said maximum number of allowable recordings is determined based on characteristics of said erasable recording medium.

18. The optical information recording method as claimed in claim 17, further comprises the step of:

r) performing the test recording on one of said first partitions other than said one of said first partitions when the recording power obtained by the test recording in step q) is outside of an allowable range.

* * * * *